Patented July 18, 1939

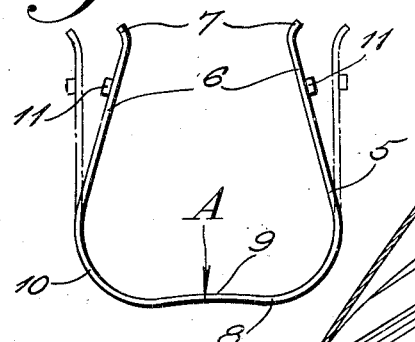
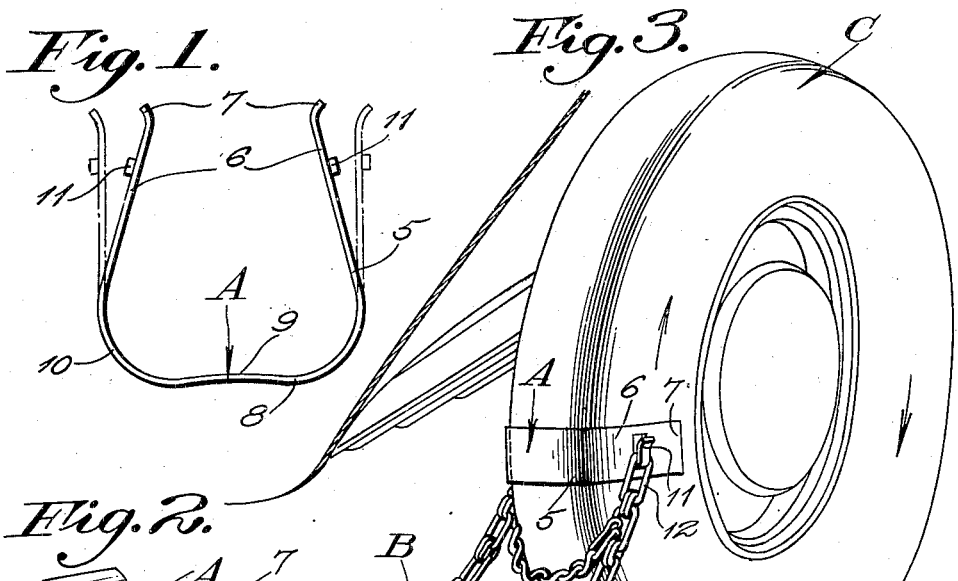
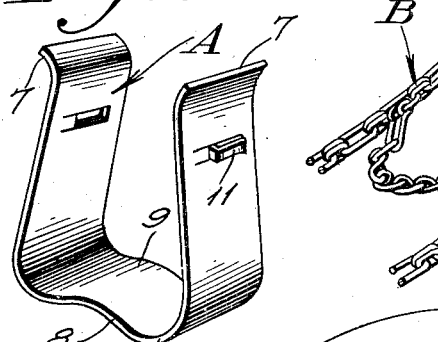
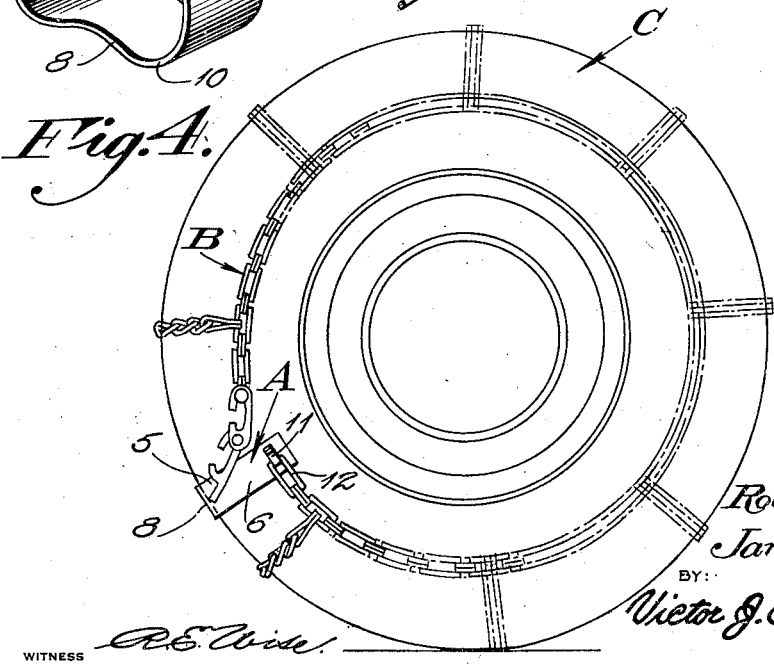

2,166,869

UNITED STATES PATENT OFFICE 2,166,869

TIRE CHAIN CLAMP

Robert Earl Lees and James S. Wilson,
Twin Rocks, Pa.

Application December 6, 1937, Serial No. 178,395

1 Claim. (Cl. 81—15.8)

The invention relates to a chain applicator and more especially to automobile tire chain clamps.

The primary object of the invention is the provision of an applicator or clamp of this character, wherein an antiskid chain can be readily and easily applied to the wheel tire of a vehicle of the motor type in a simple and easy manner and without the necessity of jacking up the said wheel for the placing of the chain upon its tire.

Another object of the invention is the provision of an applicator or clamp of this character, wherein the same is in the form of a substantially U-shaped body inherently resilient and can be saddled upon the tire so that a chain when hooked thereto at one of its ends can be carried conveniently about the tire without inconvenience and labor as is customarily required for the jacking up of the wheel having the tire and the placement of the chain about the same.

A further object of the invention is the provision of an applicator or clamp of this character, which is simple in construction, thoroughly reliable and effective in operation, light in weight yet strong, durable, readily and easily applied to and removed from the tire on a vehicle wheel and when applied will enable the easy mounting of the chain about said tire and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation of a clamp constructed in accordance with the invention showing by full lines the normal contracted condition thereof and by dotted lines an extended or expanded condition of such clamp.

Figure 2 is a perspective view of the clamp.

Figure 3 is a fragmentary perspective view showing a tired wheel of a motor vehicle with the clamp in position and connected with the chain for the application of the latter about the tire.

Figure 4 is a side elevation showing the chain about the tire and about to be fastened thereon.

Similar reference characters indicate corresponding parts throughout the several views in the drawing.

Referring to the drawing in detail, A designates generally a clamp constructed in accordance with the invention, B a portion of an antiskid chain for service upon a tire C on a vehicle wheel, the clamp being hereinafter fully described.

The clamp A comprises a substantially U-shaped inherently resilient body 5 of metal, its side limbs 6 being normally in contracted upwardly convergent relation to each other and have outwardly curled terminals 7, these side limbs being active as clamping jaws. The connecting web 8 between the limbs 6 at the closed side of the body 5 has formed medially therein an inwardly arched area 9 so that when weight is brought to bear upon this area 9 and the body having contact at the area 10 on opposite sides of the area 9 the limbs 6 through distortion activity will be caused to approach each other for more firmly clamping action upon the tire C at an interim when this clamp has made contact with the ground surface when disposed between such ground surface and the tire C on rotation or the travel of such tire upon said surface to avoid the kicking off of the clamp at such interim.

The limbs 6 of the body 5 have cut and struck outwardly therefrom hooks 11 for the separable connections of the links 12 at one end of the chain B when the latter has been stretched and laid outwardly in rear of the tire C upon the ground surface so that when the wheel turns in the direction of the arrows indicated in Figure 3 of the drawing the chain will be trained about the tire in the manner as shown in Figure 4 of the drawing when the tire is treading the ground surface and the vehicle advanced forwardly thereon. The arched area 9 in the body 5 constitutes a central fulcrum contact with the tread of the tire so that any pressure exerted upon such area from within the said body serves to increase the gripping action of the limbs 6 at opposite sides of the tire, particularly when the body is forced onto the tire and when this body 5 traveling with the wheel becomes sandwiched between a ground surface and the periphery of the tire or the tread thereof the clamp is assured of a firm hold upon the tire with the result that the chain end attached to the clamp will be maintained held upon the tire without liability of the slipping of the clamp so that the fasteners of the chain can be conveniently handled for the joining of the ends of the chain together with the chain fully draped over the tire.

The chain B when trained about the tire C is fastened in place thereon in the usual manner, the clamps being separated from the chain for this purpose.

The clamp in the use thereof is applied to the tire C by having the body 5 of such clamp straddle or saddle the tire in the manner as shown in Figures 3 and 4 of the drawing and the limbs 6 will frictionally grip the said tire and firmly hold the clamp thereon.

The hooks 11 as formed in the limbs 6 lie transversely thereof and open in the same direction with respect to each other.

What is claimed is:

A clamp of the character described comprising a substantially U-shaped inherently resilient strap-like body of uniform width throughout forming a double-armed jaw, a bight formed in the closed side of said body and arched inwardly between the arms for a distance relative thereto, outwardly flared ends formed at opposite sides of said body at the terminal of the arms, and outwardly struck hooks at opposite sides of the body and cut and bent therefrom to lie crosswise of the arms.

ROBERT EARL LEES.
JAMES S. WILSON.